United States Patent

[11] 3,543,952

| [72] | Inventor | Robert R. Young<br>Danville, California |
|---|---|---|
| [21] | Appl. No. | 717,174 |
| [22] | Filed | March 29, 1968 |
| [45] | Patented | Dec. 1, 1970 |
| [73] | Assignee | Kaiser Industries Corporation<br>Oakland, California<br>a corporation of Nevada |

[54] CONTAINER HANDLING AND STORAGE SYSTEM
5 Claims, 17 Drawing Figs.

[52] U.S. Cl. ..................................... 214/14, 214/16.4
[51] Int. Cl. ........................................ B63b 27/00; B65g 1/00
[50] Field of Search ........................................... 214/14, 16, 16(B), 16.4, 16.42

[56] References Cited
UNITED STATES PATENTS

| 1,207,226 | 12/1916 | Schilling................. | 214/16(B) |
| 2,096,958 | 10/1937 | Clerc..................... | |
| 2,511,619 | 6/1950 | Bowser.................... | 214/16.1(8-B) |
| 2,988,237 | 6/1961 | Devol..................... | 214/11 |
| 3,049,247 | 8/1962 | Lemelson.................. | 214/16.4(2) |
| 3,071,262 | 1/1963 | Bosch et al. ............. | 214/16.4 |
| 3,091,188 | 5/1963 | Graham. | |
| 3,182,823 | 5/1965 | Chasar.................... | 214/16.4(2) |
| 3,343,692 | 9/1967 | Arnot..................... | 214/16.4(2) |

FOREIGN PATENTS

| 446,825 | 5/1936 | Great Britain............. | 214/16.4(2) |
| 982,148 | 2/1965 | Great Britain............. | 214/16.4(2) |

OTHER REFERENCES
Triax Co. Application Report - Sheet and Plate Storage of R. S. and Al. Co. page 1 & 2; March 7, 1963. 214/16.4(2)

*Primary Examiner*—Gerald M. Forlenza
*Assistant Examiner*—Raymond B. Johnson
*Attorneys*—James E. Toomey, Paul E. Calrow, Harold L. Jenkins and Leo F. Costello

ABSTRACT: A system for handling large, heavy containers of relatively uniform shape at a shipping terminal including a vertical storage housing, a stacker crane for inserting containers into and removing containers from the storage facility, a carrier crane for loading containers into and unloading containers from a carrier at a terminal, conveyor units for transporting containers and being movable along a predetermined path into and out of transfer stations at the carrier crane and the stacker crane, a conveyor for moving containers between an input/output station for the terminal and the transfer station at the stacker crane, and a control center including computer means for coordinating the movement, storage, loading and unloading of containers by the cranes, conveyor units and conveyor.

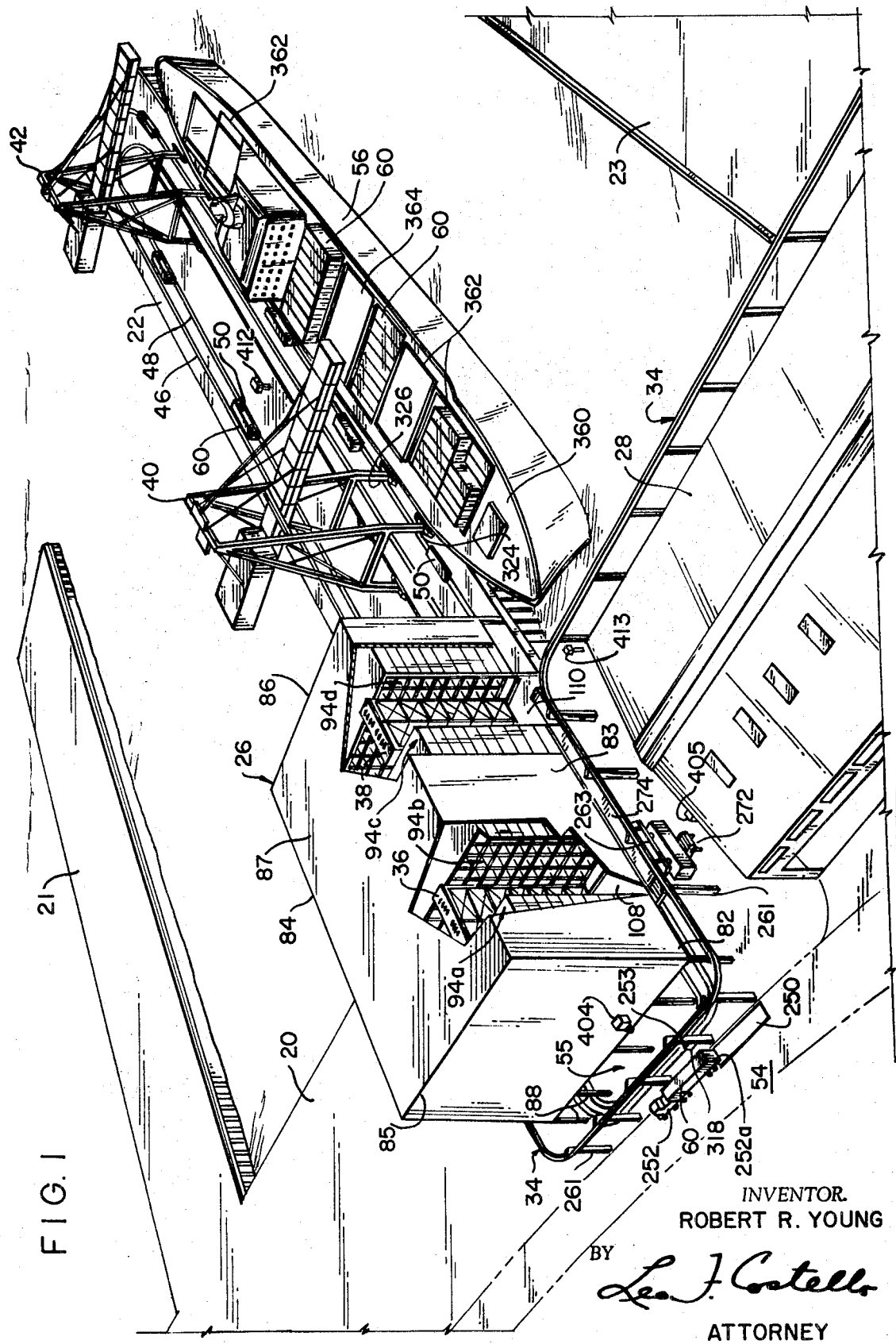

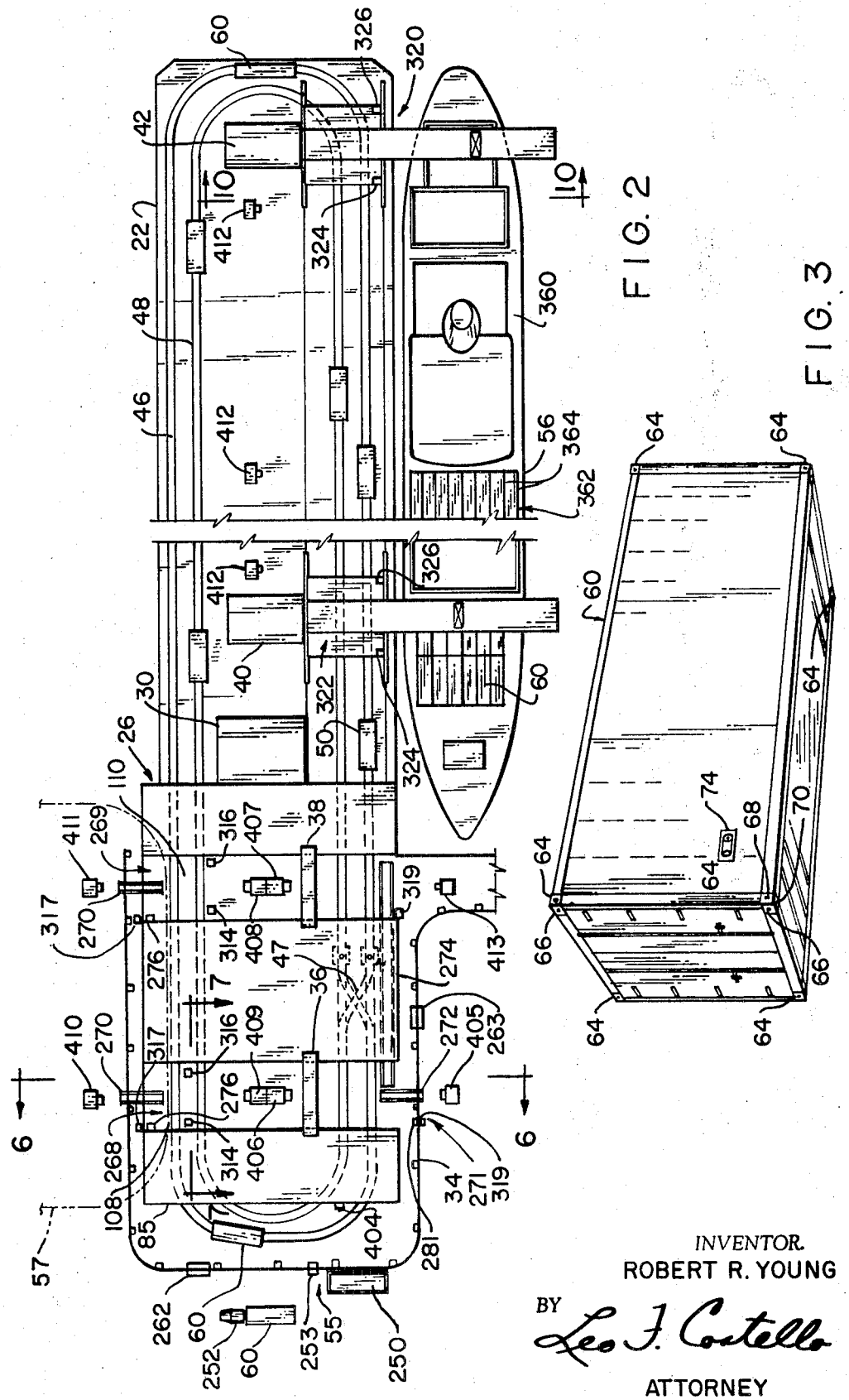

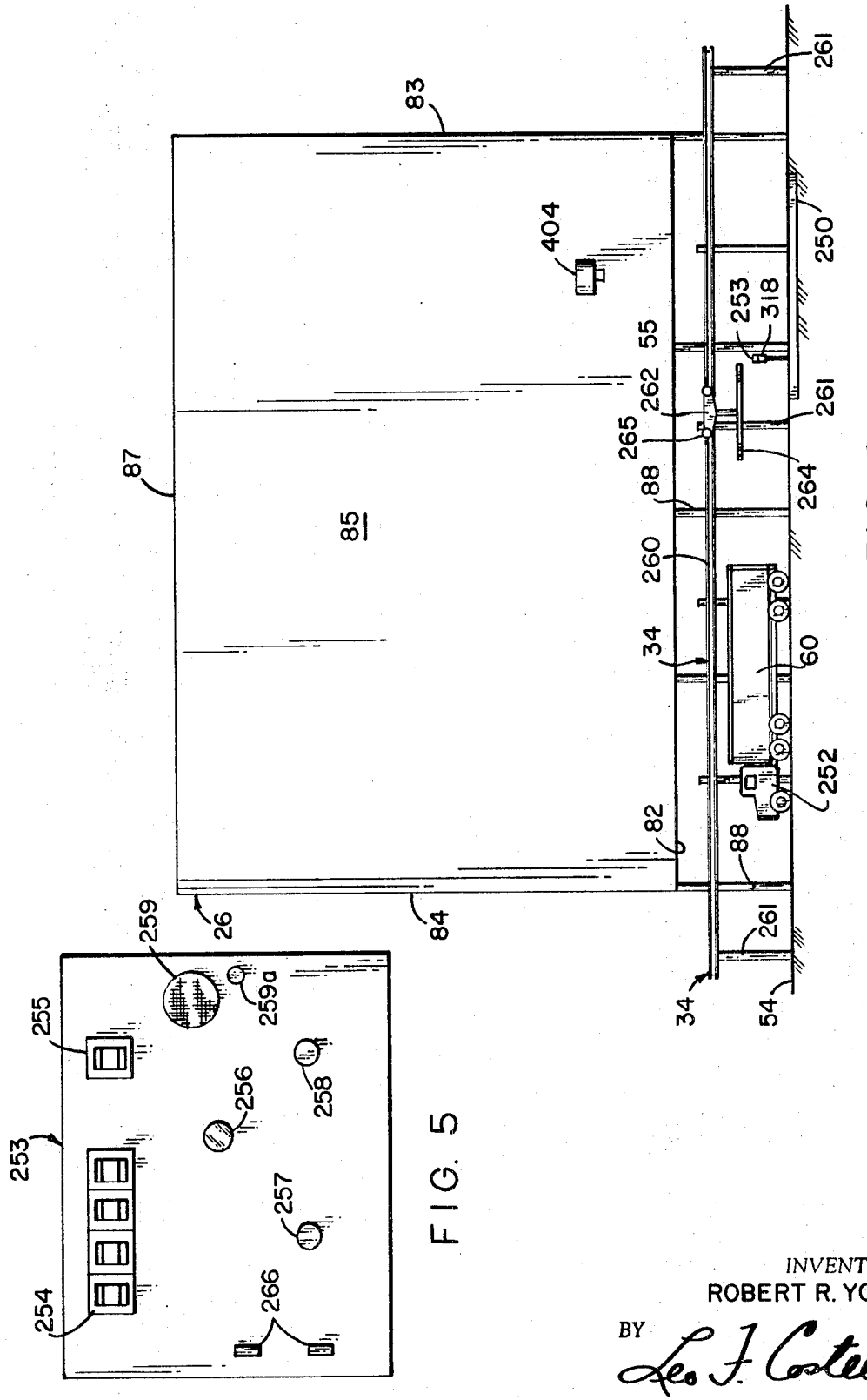

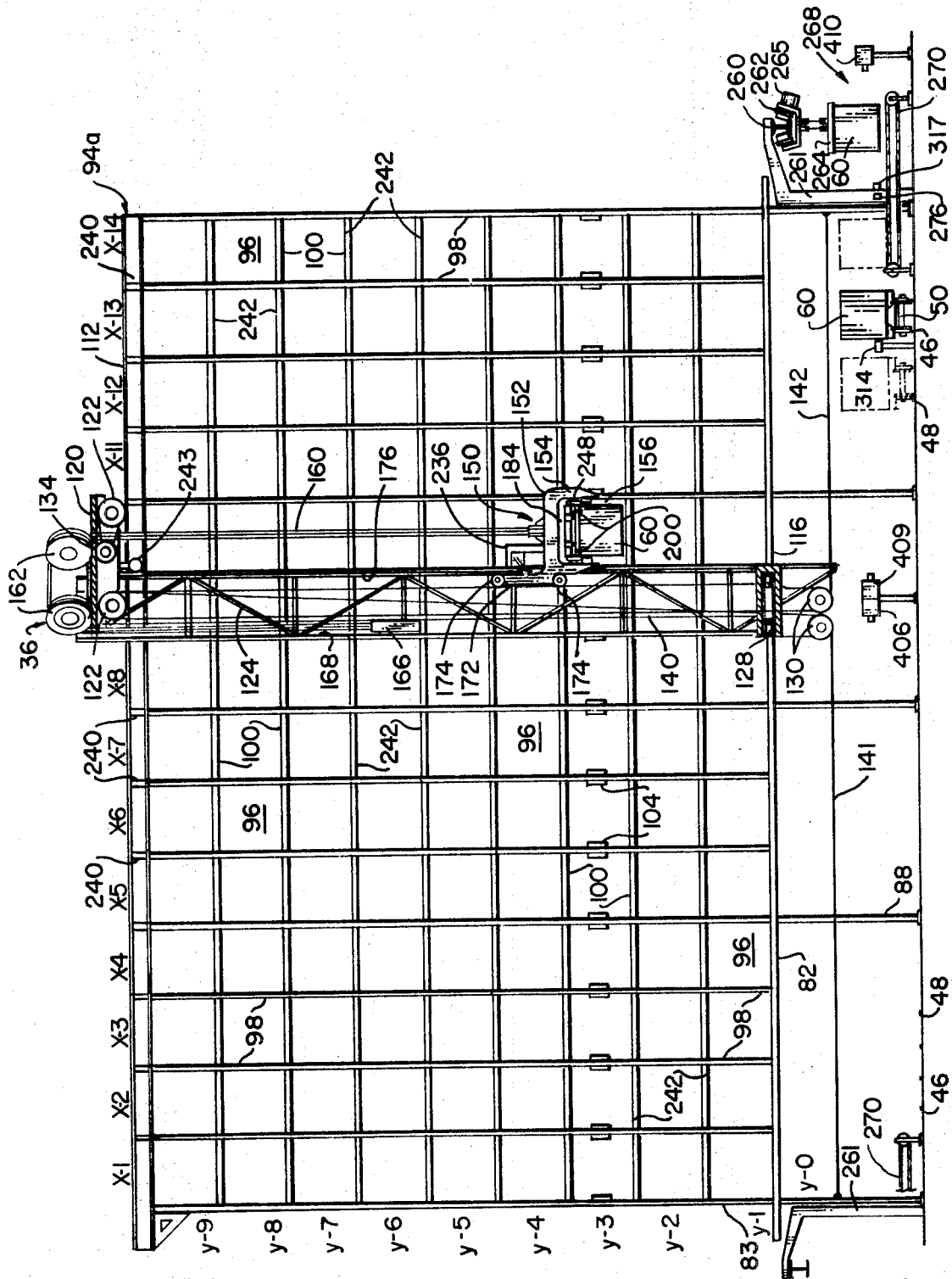

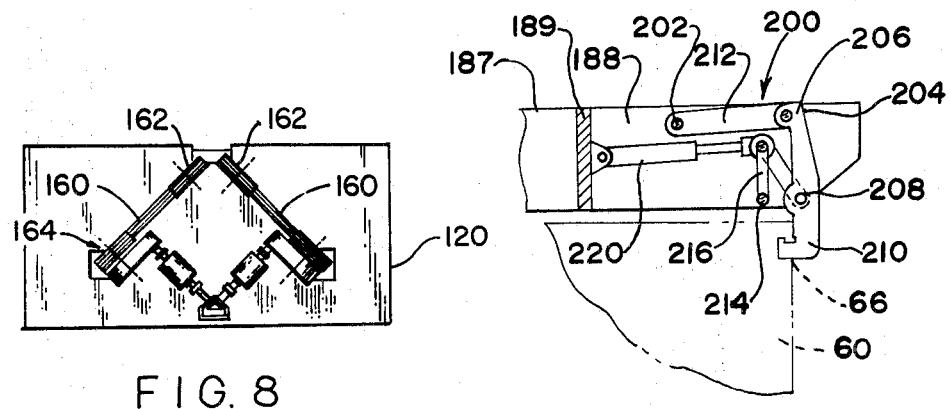
FIG. 8
FIG. 9B
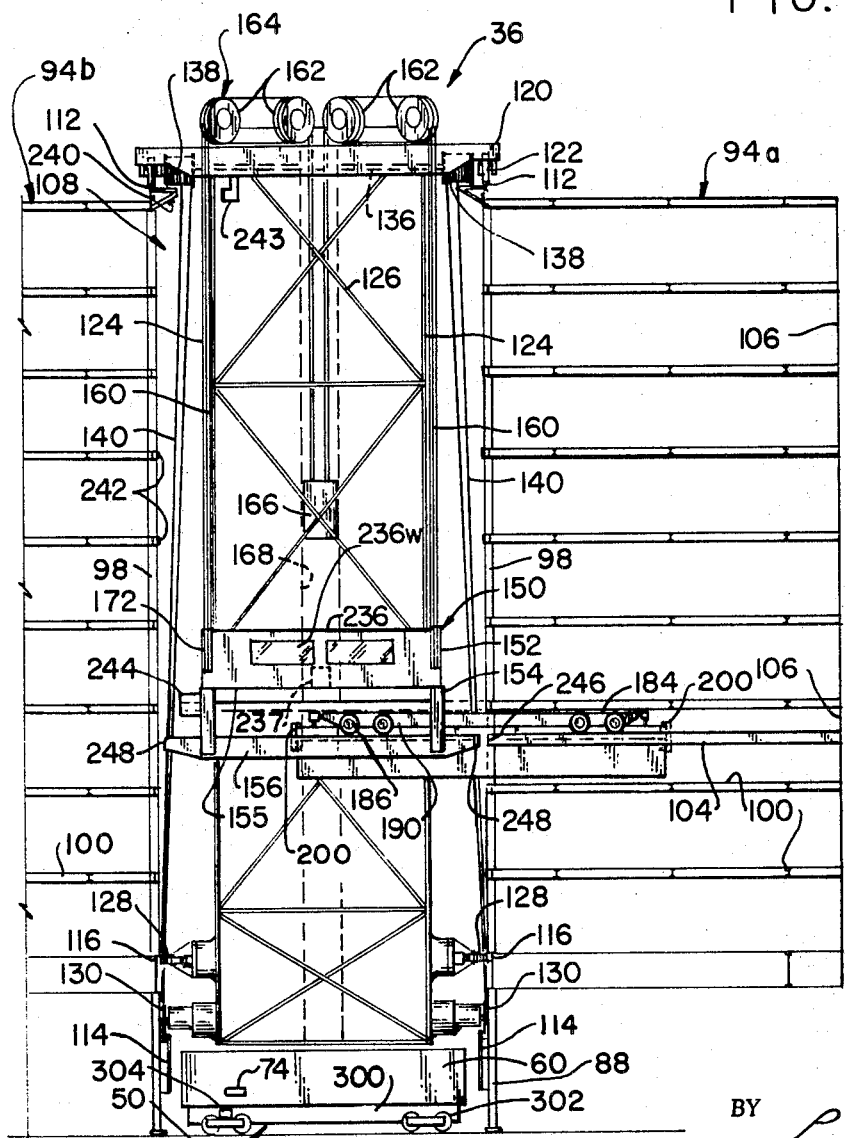
FIG. 7

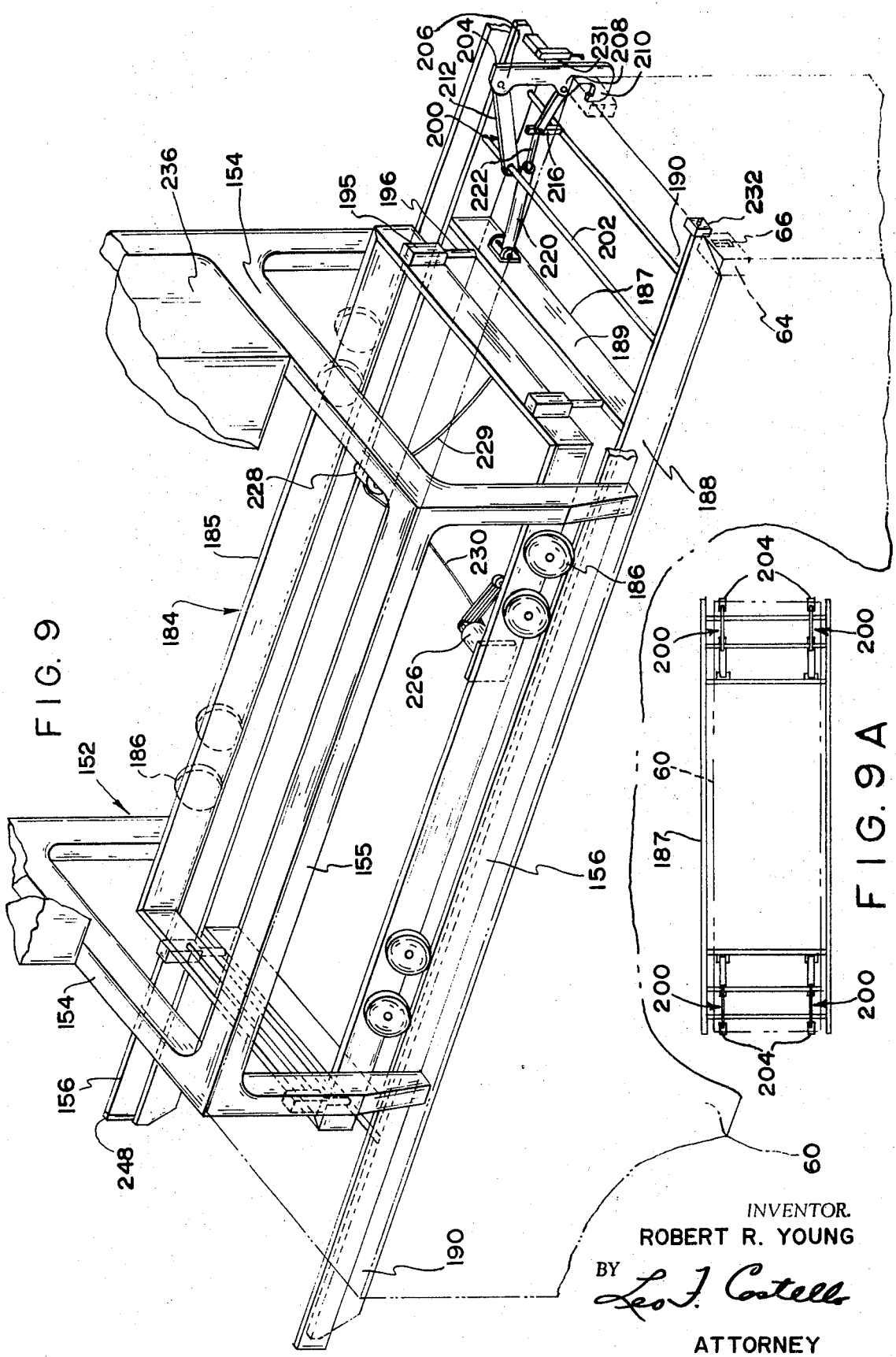

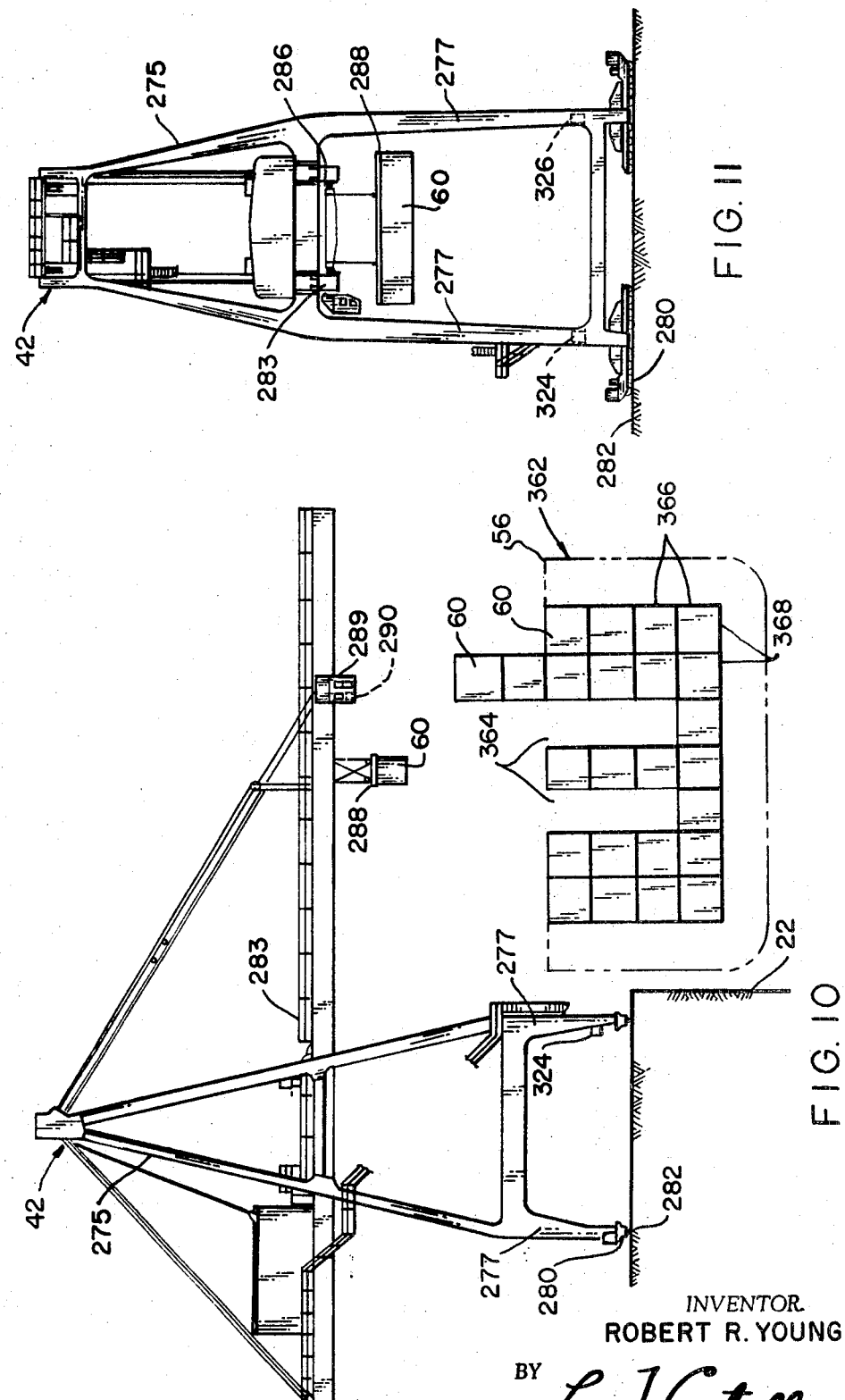

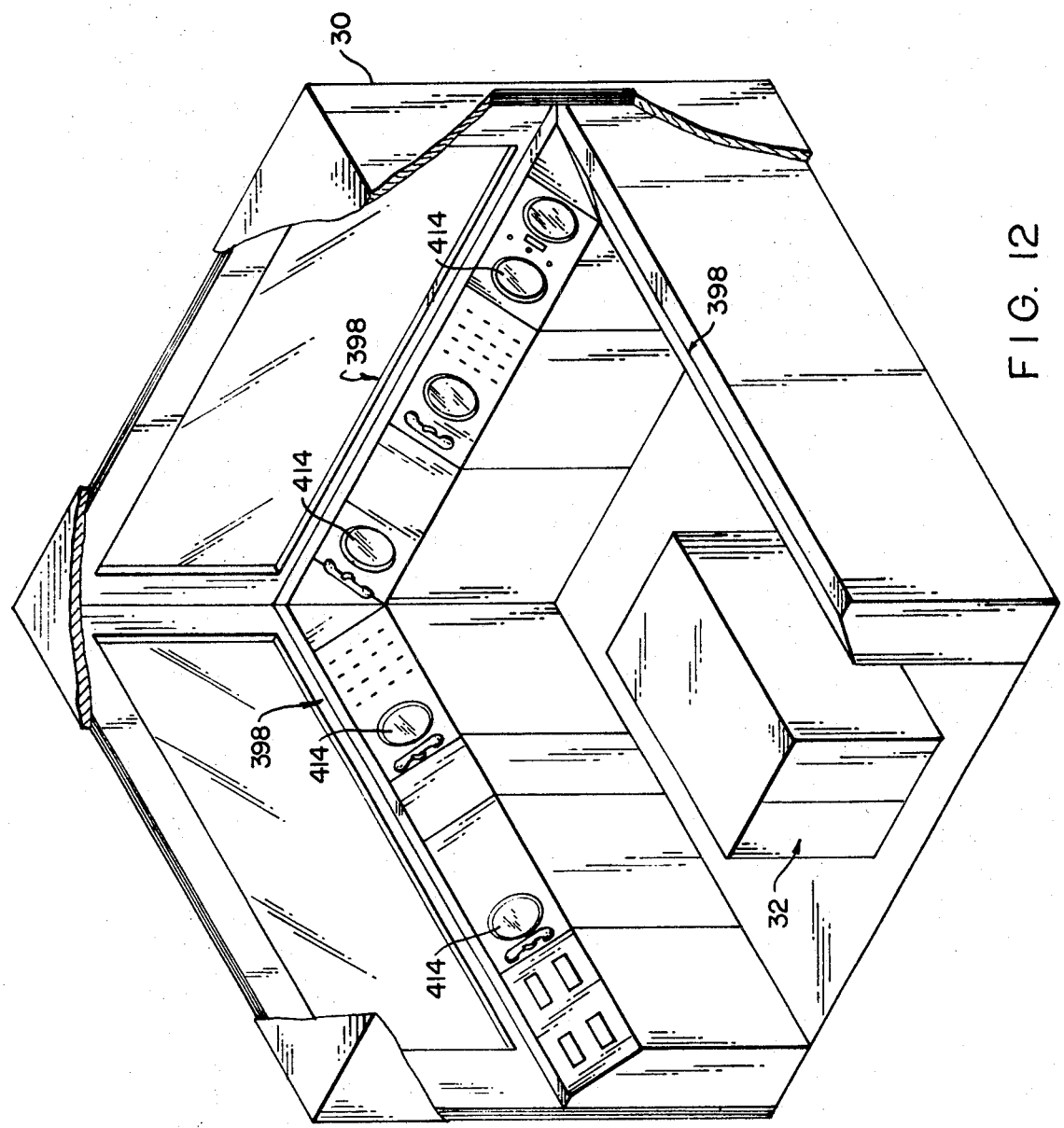

SHIP NAME:

SHIP NO.:

| HOLD NO. | MAX.CONT. LENGTH | STORAGE DESCRIPTION ||||
|---|---|---|---|---|---|
| | | SECTION | LEVEL NO. | ROWS | DECKS |
| #1 | 20 | BOW | 1-4 | 8 | BELOW |
| #1 | 20 | BOW | 5-6 | 8 | ABOVE |
| #2 | 40 | BOW | 1-4 | 8 | BELOW |
| #2 | 40 | BOW | 5-6 | 6 | ABOVE |
| #9 | 40 | STERN | 1-2 | 5 | BELOW |
| #9 | 40 | STERN | 3-4 | 5 | ABOVE |

FIG. 13

SHIP NAME:

SHIP NO.:

| CONTAINER NUMBER | MAX.CONT LENGTH | SPECIFIED LOCATION |||
|---|---|---|---|---|
| | | HOLD | LEVEL | ROW |
| 0213 | 40 | 4 | 2 | 1 |
| 9213 | 40 | 1 | 6 | 2 |
| 8213 | 40 | 3 | 3 | |
| 0721 | 20 | 4 | 2 | 3 |
| 0834 | 20 | 2 | 1 | 2 |

FIG. 14

*INVENTOR.*
ROBERT R. YOUNG
BY
*Leo F. Costell*
ATTORNEY

CONTAINER HANDLING AND STORAGE SYSTEM

BACKGROUND OF THE INVENTION

The present invention pertains to a method and apparatus for handling containers, especially large, heavily loaded containers of generally uniform shape, at a shipping terminal and more particularly to an integrated system for controlling in an orderly manner, and with a minimum of time and labor, the receipt of such containers into the system, the storage of containers in the system, the loading and unloading of containers into and from a carrier at the terminal, and the discharge of containers from the system.

Although the use of large, relatively uniform containers for transporting cargo has grown rapidly in the last decade, the development of port or terminal facilities to handle these containers has not kept pace. Certain inadequacies of the conventional facilities are described below but first, a clear understanding should be had of the type of container being handled.

These containers have evolved from truck-trailer vans and are usually made of steel, aluminum, plywood, or fiberglass and, although of a uniform shape, are of a limited variety of cross-sectional dimensions (usually about 8 feet by 8 feet) and of a limited variety of lengths (for example, 10, 20, 30, 40 feet long). A single container may weigh as much as 40 tons when fully loaded. Thus, even though these containers are large, their relative uniformity in size renders them adaptable to handling in an orderly manner as provided by the present invention.

The conventional manner of handling these containers at marine, rail or air terminals, for example, is to store the containers, usually numbering in the hundreds, outdoors in several horizontal rows which thereby occupy many acres of valuable land. The containers are set on the ground and are usually in the open. They are transported over land to and from the terminal on trucks, trains, or aircraft, are loaded onto and unloaded from ships or other carriers at the terminals by cranes rigged for the purpose or by ships' gear. They are transferred between the horizontal rows at the terminal and the cranes by trailers or straddle vehicles or perhaps directly by the vehicle carrying the container to or from the terminal. The yard vehicles are manually driven up and down and in and out of the rows, and to and from the ship, along various routes and at various speeds as controlled by their individual operators. Movement of containers to and from the ship is thus not effected with the degree of automation necessary to achieve optimum integration and coordinated control of the receipt, storage, location, loading, unloading and discharge of the containers. Therefore, not only are large land areas of high cost occupied by prior art terminals, but the handling of containers thereat is less efficient than is desirable.

The system of the present invention overcomes the described problems of the prior art by providing a method and apparatus for receiving containers into the system from a first transportation mode, such as an overland vehicle, for storing the containers in a vertical array, for moving the containers along a predetermined path between the storage facility and a crane adjacent to a second transportation mode, such as a ship, for loading and unloading the carrier with the crane, and for discharging containers from the system to the first, or still another, transportation mode. More specifically, the subject system provides for marshalling the containers in a vertical storage facility in accordance with their eventual or previous location aboard the carrier; for inserting the containers into, and retrieval of containers from, the storage facility; for controlling movement of the containers among an input/output station, the storage facility, and the cranes; and for coordinating the storing, retrieving, loading, unloading, moving and other function, many or all of which may be occurring simultaneously, at a control center which includes computer means.

BRIEF DESCRIPTION OF THE DRAWINGS

FIG. 1 is a perspective diagrammatic view of a shipping terminal and a container handling system incorporating the principles of the present invention, with portions of the storage housing of the system being broken away to show internal structures, with a truck shown at an input/output station of the system, and with a ship being shown docked at the terminal.

FIG. 2 is a diagrammatic plan view of the subject system and of part of the terminal shown in FIG. 1.

FIG. 3 is an enlarged perspective view of a container of the type which is handled by the subject system.

FIG. 4 is a partially diagrammatic somewhat enlarged end elevation of the storage housing and a portion of one of the conveyors of the system, showing in particular the input/output station of the system.

FIG. 5 is an enlarged plan of a control panel at the input/output station, but which is similar to other control panels used in the system.

FIG. 6 is an enlarged fragmentary vertical section taken on a plane at a position generally indicated by line 6–6 in FIG. 2.

FIG. 7 is a vertical section taken on a plane at a position indicated by line 7–7 in FIG. 2 but with certain parts omitted for illustrative purposes.

FIG. 8 is a plan view of a portion of the structure of FIG. 7.

FIG. 9 is an enlarged diagrammatic view of the stacker grab unit of this system with only one clamping mechanism shown, with the other details omitted for illustrative clarity and with a container shown in phantom lines.

FIG. 9A is a schematic view of the lower frame of the grab unit showing in particular the location of the clamping mechanisms.

FIG. 9B is a fragmentary detail of a clamping mechanism.

FIG. 10 is an enlarged diagrammatic section taken generally along line 10–10 in FIG. 2.

FIG. 11 is a diagrammatic front elevation of the crane of FIG. 10.

FIG. 12 is a fragmentary diagrammatic perspective of the control center of the present system.

FIGS. 13 and 14 are fragmentary views of certain documents used in the present system.

DETAILED DESCRIPTION

Figure 15:
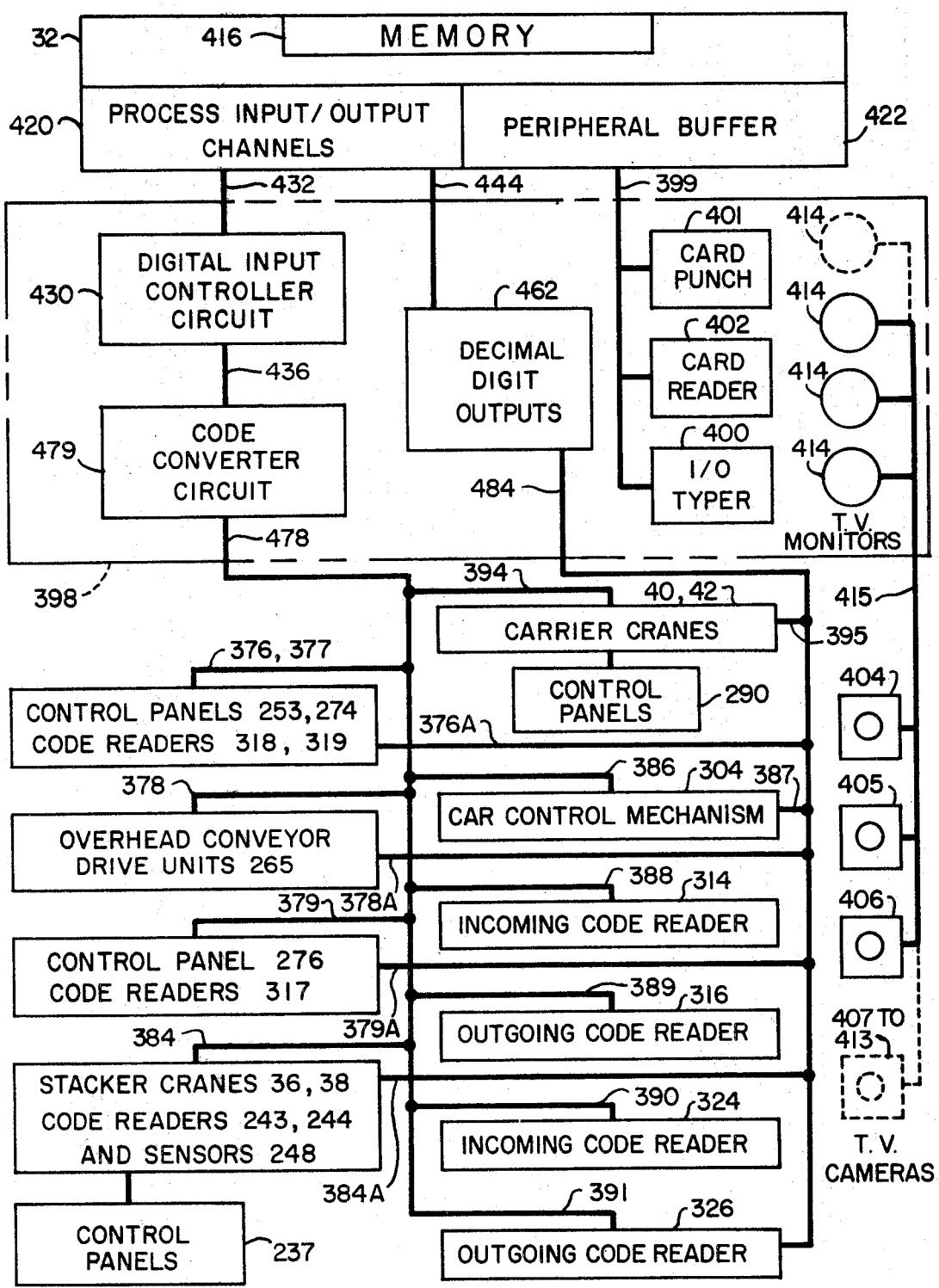
FIG. 15 is a block diagram of the computer means and the control circuits of the present system.

A container handling system embodying the principles of the present invention is generally illustrated in the drawings and is particularly adapted for use at a shipping terminal (sea, air, rail). For example, a sea terminal is illustrated in FIGS. 1 and 2 and includes a dock 20 from which finger piers 21, 22 and 23 extend out over the water. In general, the illustrated embodiment of the subject system includes a storage housing 26 located on the dock, a consolidation and break-bulk shed 28 located on the dock adjacent to the housing, a control center 30 annexed to the housing, computer means 32 in the control center, a conveyor 34 between the housing and the shed, stacker cranes 36 and 38 in the storage housing, carrier or dockside container cranes 40 and 42 on the pier 22, inside and outside tracks or paths 46 and 48 forming closed loops on the dock which extend through the aisles 108, 110 of the storage housing and under the dockside container cranes, and cars or conveyor units 50 on the tracks. A road 54 leads to and from the main highways, not shown, around the terminal to an input/output station 55 adjacent to the conveyor 34, and a ship 56 is docked at pier 22. Although not shown in detail, a road or railroad track, indicated by line 57 in FIG. 2, may also pass through the aisles of the housing, as in my above cited copending application. Also, there may be more than one input/output station.

The subject system is particularly suited for handling cargo in containers, one of which is generally identified by the number 60 in the drawings and is shown in some detail in FIG. 3. Each container has upper and lower corner fittings 64 providing end sockets 66 and side sockets 68, with the lower fittings having bottom sockets 70 and the upper fittings having top sockets (not shown). Furthermore, a code module 74 is secured to each side of each container and is coded with the container number and weight category. This number may also be painted on the container. It should be noted at this point that each of the containers used in the system can be assigned its own number which, for example, might be a four digit number as "1237". Also, the containers are preferably assigned to weight categories as follows:

| Container weight in tons: | Weight category |
|---|---|
| 0-6.9 | 1 |
| 7-12.9 | 2 |
| 13-19.9 | 3 |
| 20-26.9 | 4 |
| 27-32.9 | 5 |
| 33-40 | 6 |

The code module 74 may be a Dezignator coding unit as sold by the Industry Control Department of the General Electric Company at Salem, Virginia and described in their bulletin GE A-7646, or a coded retroreflective tape well known in the art and subsequently referred to herein, or other well known coding devices.

With reference to the storage housing 26 (FIGS. 1, 4, 6 and 7), this housing may include a floor 82, sidewalls 83 and 84, end walls 85 and 86, and roof 87 and is supported on columns 88 so that the floor is spaced above the dock 20. Internally, the housing includes a plurality (four in the disclosed embodiment) of tiers or arrays 94a, 94b, 94c and 94d of horizontally extending storage compartments 96 which are defined by vertical columns 98 and horizontal beams 100 to provide horizontal levels and vertical rows of compartments. For convenient subsequent reference, each tier, as 94a, of compartments is identified by a coordinate system in which the designations $x-1$ through $x-14$ are applied, from left to right in FIG. 6, (since there are 14 vertical rows of compartments in the disclosed embodiment), to the vertical rows of compartments; the designations $y-1$ through $y-9$ are applied, from bottom to top (since the disclosed embodiment is nine storage levels high), to the horizontal levels of compartments; and the designation $y-0$ is applied to the horizontal level below the level $y-1$ so that, for example, compartment $x-4$, $y-3$ is the compartment in the fourth row from the left and in the third level. Furthermore, each storage compartment in the disclosed embodiment has opposed horizontal parallel side rails 104 extending from the front opening of the compartment to the rear wall 106 of the compartment and spaced between the top and bottom horizontal beams 100 of the compartment. Although these rails are shown only in level $y-3$ of tier 94a in FIGS. 6 and 7, they are present in every compartment of every tier of the housing shown. The cross-sectional dimensions and the length of each compartment are uniform among the compartments and are large enough to accommodate at least one container 60, as well as the mechanism described below for moving a container into and out of the compartment.

The pairs of opposed tiers 94a, b, c and d of compartments 96 define aisles or passageways 108 and 110 extending vertically from the roof 87 of the housing 26 to the dock 20 and horizontally between the sidewalls 83 and 84 of the housing. Upper horizontal tracks 112 FIGS. 6 and 7) are mounted on the uppermost beams 100 on opposite sides of the aisle above the upper level $y-9$ of compartments in each tier, lower horizontal guide channels 114 are mounted on the columns 88 in the level $y-0$ on opposite sides of each aisle, and lower guide plates 116 are secured to the walls 98 and 100 immediately above the guide channels.

The stacker cranes 36 and 38 are an important feature of this invention and are individually located in the aisles 108 and 110, but since these cranes are identical, only crane 36 is described in detail. Thus, crane 36 (FIGS. 6, 7 and 8) has a bridge 120 extending transversely of and movable along the aisle 108 on upper vertical wheels 122 which ride on the upper tracks 112. A pair of side frames 124 and a transverse frame 126 are secured to the bridge and project downward therefrom to level $y-0$. Horizontal stabilizing wheels 128 are mounted on the lower portions of the side frames and ride along the guideplates 116 so as to resist movement of the bridge transversely within the aisle. Two vertical stabilizing pulleys 130 are mounted on the lower end of each side frame and are individually disposed in the guide channels 114. A bridge drive mechanism 134 (FIG. 6) is mounted on the bridge 120 and is connected to a drive shaft 136 which is attached to the upper wheels 122. Drums 138 are also secured to this shaft, and travel cables 140 are wound around the drums. Each cable has first and second ends 141 and 142 which extend down from the drum. The first end portion 141 of each cable passes under one of the stabilizing pulleys 130 on its side of the crane 36, extends lengthwise of the area $y-0$ and parallel to the dock, and is connected to one sidewall 83 of the housing 26. The other end portion 142 of each cable extends under the other stabilizing pulley and then in the opposite direction from and colinear with end portion 141 to the sidewall 84 to which it is attached. As the drive mechanism motivates the bridge 120 lengthwise of the aisle, the pulley-drum-cable combinations on opposite sides of the bridge resist movement of the side and transverse frames 124 and 126 out of a vertical plane or, stated otherwise, prevent skewing of the side and transverse frames relative to the horizontal levels and vertical rows of storage compartments 96.

The stacker crane 36 also includes a hoist 150 (FIGS. 6, 7, 8 and 9) which has a grab unit 152 provided with downwardly directed C-brackets 154 rigidly interconnected by beams 155 in transversely spaced relation to each other. Spaced parallel, substantially horizontal side rails 156 are secured to the depending arms of the C-brackets and extend substantially the entire width of the aisle, it being noted that the ends of the rails are in closely spaced relation to the open ends of the compartments 96. These rails are transversely spaced the same distance from each other as, and are intended to aline with, the rails 104 in the storage compartments. Support cables 160 are individually secured to the top portions of the C-brackets and extend upwardly over sheaves 162 mounted on the bridge 120 which are connected to a drive mechanism 164. The opposite ends of the support cables are connected to a counterweight 166 which is guided for vertical travel in a vertical passage 168 provided in the transverse frame 126. Furthermore, guide arms 172 are individually secured to the C-brackets and mount rollers 174 which ride in vertical guideways 176, also provided in the transverse frame.

It is thus evident that the stacker crane 36 is movable vertically and horizontally in the aisle 108 to bring the grab unit 152 of the hoist 150 into alinement with selected compartments 96 on opposite sides of the aisle 108 in the housing 26 and more specifically to bring the side rails 156 into precise alinement with the pairs of side rails 104 in the selected compartments.

The stacker crane 36 also includes a carriage 184 (FIGS. 6, 7 and 9) mounted within the C-brackets 154 for horizontal movement transversely of the aisle 108 into and out of compartments 96 with which the grab unit 152 is alined. The carriage has an upper frame 185 (FIG. 9), and pairs of front and rear wheels 186 support the upper frame on the side rails 156 for movement of the upper frame lengthwise of these rails. The carriage also includes a lower frame 187, elevationally adjustable relative to the upper frame, constructed of a pair of side members 188 interconnected by cross members 189 with the side members having end portions 190 projecting beyond the cross members. Lift cylinders 195 are secured to the upper frame 185, and piston rods 196 associated with the cylinders have lower ends connected to the crossmembers of the lower frame. Thus, by actuating the lift cylinders, the lower frame is moved upward and downward toward and away from the upper frame.

Clamp mechanisms 200 (FIGS. 6 and 9) are mounted on the carriage 184 for grasping and releasing a container 60. More specifically, a pair of clamp mechanisms is provided at each end of the carriage and includes a common pivot shaft 202 (FIG. 9) interconnecting the side members 188 of the lower frame 187. Each clamp mechanism has a hook 204 provided with a top portion 206, a central portion 108, and a hook portion 210. A link 212 pivotally interconnects the pivot shaft and the top portion of its associated hook. A rock shaft 214, also common to both clamp mechanisms at each end of the carriage, has opposite ends journaled in the side members 188 and is endwardly displaced from the pivot shaft 202. A lever 216 is secured to the rockshaft, and a bar 218 pivotally interconnects the lever and the central portion 208 of its associated hook. A clamping solenoid 220 has one end pivoted to the adjacent crossmember 188, and its associated plunger 222 is pivoted to the adjacent lever 216. Although, in FIG. 9, pivot and rock shafts are shown at only one end of the carriage and although the hook, link, lever and bar are shown only at one corner of the carriage, similar shafts are at the other end of the carriage and similar hooks, links, levers and bars are at all four corners of the carriage. Upon actuation of the clamping solenoids 220 and with the lower frame positioned over a container 60, the rockshaft 214 is rotated through a limited angle to move the hooks between clamping positions with the hook portions 210 fitted in the end sockets 66 of a container and retracted positions out of said sockets and with the hooks projecting endwardly of the carriage above the container.

Motor-operated drive mechanisms 226 are mounted on the upper frame 185 of the carriage 184 and have driving connection to the wheels 186 for moving the carriage between a retracted position within the C-brackets 154 and a projected position within a compartment 96, the wheels 186 in the latter position riding along the compartment rails 104 which are alined with the hoist rails 156 thereby to transfer a container between the hoist and the compartment. Automatically retractable air hose and electric cable reels 227 and 228 are attached to the C-brackets 154. These reels are respectively provided with flexible hose 229, which carries air to the cylinders 195, and flexible cables 230, which carry electric current to the drive mechanisms 226 and clamping solenoids 220 and other electric devices on the lower frame such as locator switches 231 and 232 which are mounted on the lower frame 187 and operate in a manner to be described.

Each stacker crane as 36 is controllable either from a cab 236 by an operator with the aid of a control panel 237 in the cab by which he communicates with the control center 30, or entirely automatically from the control center. The cab is mounted on and located over the C-brackets 154 and has windows 236w enabling the operator to see lengths to see lengthwise of the aisle 108, into the compartments 96 on both sides of the aisle 108 and down between the C-brackets. Controls and indicating devices, not shown, are provided on the control panel for operating the drive mechanisms 134, 164 and 226, the lift cylinders 195 and the clamp mechanisms 200.

From the foregoing, it will be understood that the grab unit 152 is movable lengthwise of the aisle 108, by energizing the drive mechanism 134, in order to aline the grab unit with one of the vertical rows x-1 through x-14 of the storage housing 26. The grab unit is also movable elevationally in the aisle by energizing the drive mechanism 164 in order to aline the grab unit with one of the levels y-1 through y-9. Both of the drive mechanisms 134 and 164 are operated simultaneously to aline the hoist rails 156 with selected compartment rails 104. Once in alined position, the carriage 184 is movable in either direction into and out of a compartment on either side of the aisle, and the clamp mechanisms 200 are operable to release or engage containers 60 in the compartments. Furthermore, the grab unit is movable by energization of the drive mechanisms 134 and 164 into the area y-0 below the floor 82 of the housing for picking up and discharging containers, also in a manner to be described in more detail hereinafter.

To aid in either semiautomatically or automatically positioning the grab unit 152 opposite to a selected compartment 96, with the rails 104, 156 precisely alined row-locating and level-locating code modules 240 and 242 are provided. The row modules 240 are on the beams of the storage housing 26 above the upper row y-9 and face the aisle 108. The level modules 242 are on the horizontal beams of the storage compartments and also face the aisle. Each module 240 is distinctively coded to identify a particular row or level. Row and level sensors 243 and 244 are respectively mounted on the bridge 120 and one C-bracket 154 for respectively sensing the row and level modules during movement of the bridge and the hoist 150. Furthermore, an alining target 246 is provided on the end of one rail in each compartment, and alining sensors 248 are mounted on both ends of the rail 156 which corresponds to the rails of the compartments which have the alining targets and which are adapted to be alined therewith. India Indicators, not shown, in the control panel 237 are connected to the sensors 243, 244 and 248 for use in placing the grab unit in precise alinement with selected compartments and to the switches 231 and 232 for use in positioning the carriage 184 relative to the compartment which it has entered and a container therein.

Referring again to FIGS. 1, 2 and 4, it will be remembered that the main input/output station 55 is provided along the overhead conveyor 24, at one end of the storage housing 26, and adjacent to the road 54. A scale 250 is located at this station (either in the pavement as indicated in FIGS. 2 and 4 or in the overhead conveyor, the latter location not being shown) for weighing each container 60 entering or leaving the station via truck 252. As disclosed in the above-cited copending application, railroad trains, not shown, could be used, in addition ro to or in place of the road 54 and trucks, to deliver and remove containers 60 to and from the terminal. The input/output station includes a control panel 253 having on its upper face a plurality of container number switches 254, a weight-category switch 255, an indicator light 256, a "store" pushbutton 257, a "recall" pushbutton 258, and an intercom 259 with pushbutton 259a for communicating with the control center 30. Although the relationship of the control panel to other parts of the system will be described in more detail hereinafter, it is noted at this point that for each container entering the station 55, its number and weight category are set up on the switches 254 and 255.

The overhead conveyor 34 (FIGS. 1, 2 and 4) includes a monorail 260 mounted on posts 261 in vertically spaced relation to the dock 20 and extending from the consolidation shed 28 toward the storage housing 26, along the sidewall 83, then along and adjacent to the end wall 85, and then along the sidewall 84 to the aisle 110. The overhead conveyor also includes trolleys 262 and 263 independently movable along individual segments of the monorail and carrying conventional spreaders 264 for attachment to the containers 60. Each trolley has a drive unit 265 for effecting its movement along the tracks and for raising and lowering and clamping and retracting the spreader. Electrical power is delivered to the drive units by a conventional third rail system, not shown, and movement of the trolleys along the monorail can be controlled from the control center 30 or from the input/output station. Suitable controls 266 are incorporated in the control panel for raising and lowering the spreader and clamping and retracting the same. When a truck 252 is in the input/output station 55, the trolley 262 is stopped adjacent to the truck in order to lower the spreader to attach the same to the container on the truck or to deposit a container on the truck.

Interchange stations 268 and 269 (FIG. 2) are provided adjacent to the sidewall 84 of the housing 26 respectively in alinement with the storage aisles 108 and 110. Each interchange station includes a transfer conveyor 270 longitudinally alined with its associated aisle and having one end extending under the monorail 260 and an opposite end (FIG. 6) extending into the aisle in the area y-0 with the inner end portion of the conveyor in approximately the same vertical plane as the outermost row x-14 of storage compartments 96. A stacker transfer station 271 is provided adjacent to the other sidewall 83 of the housing 26 in the aisles 108 and 110. This transfer station includes a transfer conveyor 272 having one end extending under them the monorail 260 and an opposite end extending into the aisle 108 in a manner similar to conveyor 270, and an interaisle conveyor 274 having one end adjacent to the conveyor 272 and extending between the two aisles 108 and 110.

Containers 60 are transferred between the input/output station 55 and the storage housing 26 through the interchange stations 268 and 269, whereas the stacker transfer station 271 is used to transfer containers between the storage housing and consolidation shed 28. Trolley 262 moves containers between the station 55 and stations 268 and 269, and trolley 263 moves containers between the stations 55 and 271 and the shed 28. Further, containers are transferred between the aisles 108 and 110 by the interaisle conveyor. A control panel 281 is located at the stacker transfer station for controlling elevational adjustment and clamping of the spreader on the trolley 263, for controlling movement of the trolley 263, and for communicating with control center 30.

It is to be noted that the trolleys 262 and 263 and the monorail 260 along with the input/output station 55 may not be employed if the road/track indicated by line 57 is used since the trucks and/or trains would bring containers directly to the interchange stations.

With particular reference to FIGS. 10 and 11, the dockside container cranes 40 and 42 are of generally well-known construction and will not be described except to refer to main components thereof. Thus, each dockside crane includes a tower 275 having front and rear pairs of legs 277 resting on wheels 280 which ride along parallel rails 282 on the pier 22. A boom 283 is pivotally mounted on each tower, and a trolley 286, supporting a container grab 288, and an associated cab 289 are supported for travel on and under the boom when the boom is in its horizontal projected position. With the dockside cranes located on the pier 22 as described, their booms can be extended over the ship 56 docked at the pier, and their grabs can be moved from a position over the ship to a position over the dock and between the legs of their associated towers. Each cab contains a control panel 290 for operating the dockside crane and communicating with the control center 30.

The railroad track loops 46 and 48 (FIGS. 1 and 2), constituting a part of the subject system, have one set of straight side sections, along one side of the pier 22 and housing 26, which extend between the front and rear pairs of legs 277 of each carrier crane 40 and 42 and transversely of the aisles 108 and 110 past the stacker transfer station 271; another set of straight side section, along the opposite side of the housing and pier, which extend transversely of the aisles past the interchange stations 268 and 269 and arcuate end sections joining opposite ends of the side sections. The tracks define two generally oval closed paths which, in effect, link or join the dockside cranes with the storage housing. The inside and outside loops extend through the housing (FIG. 6) approximately under the rows x-2, x-3, x-12 and x-13 of storage compartments 96. The loops are also in inwardly adjacent relation to the transfer conveyors 270 and 272.

A plurality of electric railroad cars 50 are provided on each loop of track 46 and 48. Although the system is not limited to any particular number of cars, five cars per loop is a suitable number. Each car has a flat bed 300 (FIG. 7) of sufficient length and width to accommodate the largest size container 60 used in the system, wheels 302 riding on the tracks of their respective loops, and a drive control mechanism 304 having driving connection to at least one set of wheels.

Spaced incoming and outgoing container code readers 314 and 316 are mounted along the loops 46 and 48 where the latter pass through the stations 268 and 269, and code readers 317, 318 and 319 are provided at the interchange stations 268 and 269 and at the input/output and transfer stations 55 and 271. Crane transfer stations 320 and 322 (FIG. 2) are provided where the looped tracks 46 and 48 pass under the dockside container cranes 40 and 42, respectively, and outgoing and incoming container code readers 324 and 326 (FIGS. 10 and 11) are mounted on the legs 277 of each dockside crane for identifying the containers 60 as they enter and leave the crane transfer stations. These code readers are compatible with the code modules 74 on the containers 60 for identifying the containers which enter and leave these stations. Thus, if the General Electric Dezignator units referred to above are used for the code modules, the code readers are also for the type set forth in the GE bulletin cited above. Alternatively, however, both the code modules and the code readers can be those of the Kartrack (a trademark of Sylvania Electric Products, Inc. automatic car identification system made and sold by Sylvania Electric Products, Inc., a subsidiary of General Telephone and Electronics, at their Commercial Electronics Division, Burlington Road, Bedford, Massachusetts and described and illustrated in Sylvania's bulletin entitled "Kartrak Automatic Car Identification System by Sylvania." All of these code readers are, of course, directed toward the code modules 74 on the containers as the latter pass the readers and are electrically connected to the control center 30 to provide signals which identify the containers that move into and out of these stations.

The present system is suited for use with various container ships one of which is typified by the ship 56 in FIGS. 1, 2 and 10. The ship has a deck 360 and a plurality of holds 362 extending below the deck. Above the deck, containers are also stowed. Each hold is divided into a number of compartments 364 which are arranged in a plurality of levels 366 below deck. The number of levels below and above deck will vary with the construction of the ship. Furthermore, within each hold, the compartments are arranged in vertical rows 368.

Preferably, containers 60 are placed in the storage housing 26 in compartments 96 which have a relationship to certain compartments 364 on the ship 56. This correlation of compartments facilitates subsequent transfer of the containers from the housing to the ship and, in many instances, facilitates transfer of containers on the ship into the housing. In this regard, a ship storage configuration list 500 (FIG. 13) and one or more ship loading lists 502 (FIG. 14) are compiled. The configuration list 500 identifies the name and number of the ship to which it pertains and includes a left-hand first column 504 which identifies the hold number in the ship, a second column 506 that identifies the maximum container length that will fit in each compartment 364 of the various holds 362, a third column 508 which indicates whether the hold is located in the bow or the stern of the ship, fourth and sixth columns 510 and 512 that specify the number of levels in a each hold below deck and the number of levels above deck, and a fifth column 514 which indicates the number of rows of compartments in each hold. It will be understood that each ship has its own configuration list depending upon the construction of the ship and that such a list is made available to the system operator(s) in the control center 30 prior to any loading and unloading operation of a particular ship.

Each ship loading list 502 (FIG. 14) identifies the name and number of the ship to which it pertains and specifies the number of the container 60 in the left-hand first column 520 and the length of the container in the second column 522. The third, fourth, and fifth columns 524, 526 and 528 indicate the number of the hold, the level, and the row in which each container is to be placed, or has been placed, on board a particular ship.

The placement of the containers 60 in the storage housing 26 is based upon both the ship storage configuration and the ship loading lists 500 and 502. In this regard, the storage compartments 96 may be allocated to various zones in each tier 94 depending on the particular needs of the terminal and with the zone including compartments to which below-deck containers are assigned being preferably in the closest proximity to the interchange stations 268 and 269.

The movement and location of the containers 60 is coordinated from the control center 30 (FIGS. 2 and 12) with the aid of the computer means 32, as schematically illustrated in FIG. 15. Thus, signals identifying container number and weight category are transmitted over lines 376 and 377 from the control panels 253 and 274 to the control center. Control signals between the control center and the trolley drive units 265 are transmitted over line 378 which includes a third rail system. Signals identifying the containers to be stored or retrieved and their storage compartments 96 are transmitted between the control center and the stacker crane cabs 236 by line 384 including a third rail system. For controlling the movement of the railroad cars 50 into and out of the transfer stations 268, 269, 320 and 322, signals are transmitted between the car control mechanisms 304 and the control center 30 by lines 386 and 387 which include a third rail system. Lines 388, 389 390 and 391 connect the control center and the code readers 314, 316, 324 and 326. Still further, communication between the operators in the dockside container crane cabs 289 and the control center 30 is effected over lines 394 and 395; here also, the lines 394 and 395 include a third rail system operating over rails 282. Although the singular word "line" has been used above, it will be understood that one or more electrical conductors may be included as needed in each line.

A master control console 398 (FIGS. 12 and 15) is provided in the control center 30 and is electrically connected to the computer means 32 by lines 399, 432 and 444. The main communication lines 415, 478 and 484 interconnect components throughout the system and the console which includes appropriate well-known visual and audible receiving and transmitting equipment compatible with similar equipment at the other ends of these lines. The console also includes an input/output typer 400 preferably incorporating tape punch equipment, a card punch 401 and a card reader 402.

A closed circuit television system is provided for enabling observation and remote operation of various equipment from the control center 30. Thus, television cameras 404, 405, 406, 407, 408, 409, 410, 411, 412, and 413 are respectively located at the input/output station 55; externally and internally of the housing 26 at the interchange and stacker stations 268, 269 and 271; and at the dockside crane stations 320 and 322. Television monitors 414 electrically connected to the cameras are located in the console 398 at the control center; and similar monitors, not shown, are located in the control panels of the stacker and dockside crane cabs 236 and 289. The monitors in the stacker cranes need only be electrically connected to the cameras in their associated aisles, and the monitors in the dockside crane cabs need only be electrically connected to the cameras for the c dockside cranes stations.

A specific example of commercially available equipment which can be used as computer means 32 is a computer manufactured and sold by the General Electric Company at their Process Computer Business Section in Phoenix, Arizona and identified as their Model GE PAC 4020 and 4020A and described in their bulletin GEA-7272A. The major components of this computer and their relationship to the other components of the present system are briefly described at this point. In connection with the description of the computer means, it is also convenient to describe certain aspects of the operation of the subject system, it being noted, however, that the system is adaptable to various degrees of automation. In the present description, reference is made to "automatic" and to "semi-automatic" modes of operation. As will be seen, in the semiautomatic mode or modes, several human operators are stationed at various locations throughout the system and, with the aid of the computer means 32 and the communication network provided including both audio and video transmission, these operators monitor and control the system. In the automatic mode, fewer human operators are required (although one or more may still be present during shakedown periods, for checking purposes or at other times) and more of the operations are under the direct control of the computer means. It will be further apparent that various degrees of automatic and semiautomatic operation of the subject system can be provided by merely changing the input/output transmissions to and from the computer means 32 and by changing the programing of the computer means in accordance therewith.

With reference to FIG. 15, the manner in which the inputs and outputs of the computer means 32 are connected to the functional components or units of the system is schematically shown therein. Since, as above noted, the computer means is a commercially available unit which may be programed in a manner known in the art to accomplish a desired process control in response to predetermined input and output signals, a detailed description of the computer program is not included hereat. Such program will be readily apparent to those skilled in the art from the following detailed description of the inputs to, and outputs from, the computer means; the inputs to and outputs from the functional units; and the interconnections therebetween.

As shown in FIG. 15 the computer means 32 includes a multithousand-word memory 416 which is wired to accept and store the information on the ship configuration list, as 500, and further to accept and store the information on one or more ship-loading lists, as 502, for each ship 56. Moreover, in a typical installation, the computer means may be required to store the lists for each of several ships which may be incoming or outgoing to the port over an extended period of time. The ship-loading and configuration lists are fed into the computer means 32 over the card reader 402, path 399, and a peripheral buffer 422 input to the computer means for storage in the word memory 416. The memory 416 is also wired to accept and store the location of the storage compartments 96, the container numbers and weight categories for all of the containers 60 in the system.

Assuming that a container 60 is delivered on a trailer 252a to the input/output station 55, the incoming container is weighed and then identified by the code reader 318, in the automatic mode of the system, or by an operator at the station 55, in the semiautomatic mode of the system. The container identification information (number and weight category) is transmitted either by the code reader 318 (or by the operator by means of the control panel 253) over path 376, 478 to a code converter circuit 479 which converts the output signals of the code reader or control panel to digital signals, and thence over path 436 through the digital input controller circuit 430 and then by path 432 to process input/output channels 420 in the computer means 32. In still another semiautomatic mode, the operator at the input/output station 55 uses voice communication by means of his control panel 253, and the path above described, to inform the operator in the control center 30 of the necessary information about the incoming container. Furthermore, the operator in the control center can observe the action of receiving, weighing and identifying the incoming container on the appropriate TV monitor 414 by virtue of signals transmitted over path 415 from the television camera 404 at the input/output station.

In one embodiment of the present system, the main computer program may be written so that the computer means 32 compares the input information, which relates to the identification of the container 60 and which has been provided over the above described input path, with the information in the ship-loading lists 502 in the memory 416, and, upon locating the container on one of these lists, determines the interchange station 268 or 269 to which the incoming container is to be moved; this latter determination is made by the computer with reference to the information in the memory 416 about the locations of the storage compartments 96. In other words, stored in the memory of the computer is the information about which compartments are vacant. As a specific example, let us assume that the incoming container is number 9213 (FIG. 14). From the information stored in the memory, the computer determines that this container should be stored in a compartment 96 in a zone of one of the tiers 94 which zone has been assigned the abovedeck containers since, from the information on the lists 500 and 502, container number 9213 will eventually be loaded aboard a vessel in hold number 1, level number 6 and row number 2, the ship configuration list denoting that the location of this compartment 364 aboard this ship is an abovedeck location. It should be understood that the destination of this incoming container is implicit in the ship loading list 502; that is, the shipper orders the terminal at San Francisco, for example, to send container number 9213 to Tokyo, Japan, for example. The San Francisco terminal knows that vessel has Tokyo as one of its ports of destination and thus, in making up the ship-loading list for the vessel at the San Francisco terminal, the terminal places container number 9213 in one of the compartments on this ship, having in mind the best order of unloading as the ship stops at the various ports of destination. A ship-unloading list, of the same form as list 502, is made up for the terminal at Tokyo for the vessel so that when the vessel is unloaded at Tokyo, container number 9213 will be unloaded because it is on the unloading list. As disclosed in the above-identified parent application, the ship loading list for a given ship in the form of magnetic tape or other computer-adaptable storage device can be transported with the ship and used in the computer at the unloading destination to unload the ship.

Returning now to the operation at the input/output station 55, the spreader 264 for the trolley 262 is attached to the incoming container 60 and the drive unit 265 is energized to move the trolley and the now attached container to one of the interchange stations 268 or 269. In the automatic mode of the system, the signal energizing the drive unit 265 is sent thereto over a path which includes the process input/output channels 420, path 444, decimal digit output circuit 462 and path 484, 378A to the drive unit. In semiautomatic modes of operation, the drive unit is energized by an operator or by the computer means 32 in the control center 30 which sends a signal over the same path as that described above for the automatic mode or signals the operator at the input/output station 55 over output path 484 and path 376A to the control panel 253, the operator at the input/output station then energizing the drive unit 265 by means of the control panel 253 to move the trolley to the interchange station. Whether in the automatic or semiautomatic mode, the computer means 32 or an operator in the control center 30 determines the interchange station to which the trolley should be moved.

Assuming that the interchange station 268 is the one designated, as the container 60 arrives at this station, the code reader 317, in the automatic mode of the system, provides the code of the container to the computer 32 over path 379, and the input path previously described to the process input/output channels 420 for the computer means. The computer means responds by sending a signal over path 444, decimal digit output circuits 462, path 484 and 378A to the drive unit 265 for the trolley 262 to stop the same at the interchange station 268 and to lower the container and release the same on the transfer conveyor 270 at this station. Thereupon, the transfer conveyor moves the container into aisle 108 of the storage housing 26 to a position at the end of the transfer conveyor where the container is stopped to await pick up by the stacker crane 36. Once the trolley has discharged the container, the trolley is returned either directly to the input/output station 55 or first picks up an outgoing container at either station 268 or 269 and carries it to the station 55.

In a semiautomatic mode of the system, an operator in the control center 30 observes the container being moved into the interchange station 268 on the appropriate monitor 414 associated with the TV camera 410 and, at the appropriate time, this operator sends a signal (over the same path as the computer controlled signal) to the drive unit 265 for the trolley 262 to stop the trolley and set the container down on the conveyor 270. In a still further semiautomatic mode, an operator at the interchange station 268, by means of a control panel 276 and communication paths 379, 478 and 484, 379A to an from the control center, stops the trolley and causes the same to set the container down on the transfer conveyor; furthermore, the operator at the interchange station communicates with the control center 30 to convey information that the container is at the interchange station and awaits pickup by the stacker crane 36.

In the automatic mode of the system, the master control program of the computer means 32 is written to scan the memory 416, in response to receipt of a signal from the code reader 317 that a container 60 is at the interchange station 268, to determine an empty compartment 96 for the container and then to signal the stacker crane 36 to pick up the container and move it into this compartment. In that the memory 416 has a complete list of the compartments which are storing containers, the computer means, upon determining the compartment in which the container is to be placed, transmits this information to the stacker-driving mechanisms 134 and 164 over path 444, outputs 462, path 484 and 384A to the drive mechanisms 134 and 164 thereby to cause the stacker crane 36 to pick up the container from the transfer conveyor 270 and to move the same to a specified compartment, for example $y-7, x-12$ in one of the tiers 94a or 94b.

When the stacker crane 36 reaches the designated compartment 96, as determined by information fed back to the computer 32 from code readers 243 and 244 and sensor 248, the computer means 32 transmits signals over path 444, 462, 484, 384A to the carriage drive mechanism 226 (FIGS. 9 and 15) to move the carriage in the correct direction into the desired compartment 96. When the limit switch 232 strikes the back wall 106 of the compartment, a signal is transmitted to the computer means via path 384, 478, 479, 436, 430 and 432 indicating that the carriage has penetrated the compartment to the desired distance. The computer means then returns signals over the designated paths successively stopping the carriage travel, actuating solenoid-controlled valves, not shown, to actuate the cylinders 195 to lower the container onto the horizontal beams 100 constituting the floor of the compartment, actuating the clamp mechanisms 200 to release the container from the grab unit 152, actuating such valves to actuate the cylinders to raise the lower frame 187, actuating the carriage drive mechanism 226 to return the empty carriage to its retracted position within the C-brackets 154, and actuating the drive mechanisms 134 and 164 to return the stacker crane 36 to its home position at $y-1, x-14$ or to some other compartment 96 to pick up a container and move it back to the home position.

In the semiautomatic mode of this system, control information for the stacker crane 36 is transmitted either from the control center 30 or from the control panel 276 to the operator in the cab 236 of the stacker crane via his control panel 237. Thereupon, the stacker crane operator operates the appropriate controls to pick up the container and move it to the compartment (i.e. compartment $y-7, x-12$ to use the same example as above) of the designated tier 94a or 94b. Since the operator in the stacker crane cab can visually determine the availability of the compartments, however, it is not necessary, in this semiautomatic mode, to program the computer means 32 to provide information as to compartment availability to the stacker crane operator, although if the zone system as noted above is employed, it may be desirable to inform the stacker crane operator of the zone to which the container is to be taken.

With the movement of the stacker crane 36 to the compartment 96, and storage of the container 60 therein, the code readers 243 and 244 on the stacker crane 36, as above mentioned, transmit the information that this container has been stored in this particular compartment back over paths 384, 478 and the input path previously described to computer means 32 for storage of this information in the memory 416. In the semiautomatic mode, the operator in the stacker crane cab 236 transmits such information back over the same communication path, by means of his associated control panel 237, to the computer means 32 and/or to an operator in the control center 30.

It is to be noted that for the automatic mode the stacker crane drive mechanisms 134, 164, 195 and 200; the car control mechanisms 304; and the conveyor drive units 265 include means to convert a decimal digit output from circuits 462 into signals which are capable of operating these various mechanisms and units.

In the manner described above, therefore, containers 60 are received into the terminal and placed in the storage housing 26. The handling of incoming containers is only one of the operating sequences of the system and thus attention is now directed to the loading and unloading of a ship 56 at the pier 22. Assuming that the storage housing is at least partially filled with containers 60 to be loaded aboard the ship 56 at the pier 22 and further assuming that the computer means 32 has been programed with the lists 500 and 502 as explained above, the loading and unloading operations are described at this point with reference to both automatic and semiautomatic modes. Before describing the operational steps, it is to be noted that one dockside crane, as 40 (FIG. 2), loads and unloads the holds 362 in the bow of the ship 56, whereas the other dockside crane 42 operates in the stern of the ship. Furthermore, the dockside crane 40 transfers containers 60 between the bow of the ship and electric cars 50 which are on the inside loop of track 48, the cars on this inside loop stopping at the interchange station 269, so that containers which are loaded or unloaded in the bow of the ship are stored in either tier 94c or 94d of the storage housing. Dockside crane 42 transfers containers between the stern of the ship and tiers 94a and 94b by way of the electric cars on the outside loop or track 46 and the interchange station 268. It will thus be evident that the defined relationship between the dockside cranes and the tiers of storage compartments 96 will have a bearing on where the containers 60 are initially placed in the storage housing and this relationship will be reflected in the lists 500 and 502 constituting a part of the program for the computer means 32. The relationship between the dockside cranes and the tiers in the storage housing is optional and could be reversed if desired. Furthermore, crossover tracks 47, placed into operation by suitable switch tracks, are provided to enable electric cars to be transferred between the inside and outside track loops as needed. As described herein, however, each dockside crane has the above described relationship with a particular pair of tiers in the storage housing.

Considering first the unloading procedure of only the dockside crane 40 (FIG. 2), the inside loop 48 and the stacker crane 38, the computer means 32 (FIG. 15) scans the ship-unloading list 502 (previously placed in memory 416 as described) for the incoming ship 56 docked at the pier 22 and provides information relative to the containers 60 to be removed from the ship via the input/output process channel 420 and the previously described path over decimal digit output circuit 462 and path 395 to the control panel 290 in the cab 289 of the dockside crane 40.

The operator in the cab 289 of dockside crane 40 thereupon operates the grab 288 of his crane to clamp onto, hoist and transfer the first identified container 60 to an electric car 50 stopped and waiting at the transfer station 322. When the crane operator has effected placement of the container on the electric car, information to this effect is transmitted by his control panel 290 and paths 394, 478 and the input circuit previously described to the process input/output channels 420 in the computer means 32. The computer means then provides an output start signal over the process input/output channel 420, the output circuit 462, and paths 484, 387 to energize the control mechanism 304 of the car at station 322 to move this car, and its container, toward the interchange station 269. Because of the block system incorporated in the electric circuit for the loops of railroad tracks 46, 48 and cars, the moving car and container automatically advance to the next block position along the loop 48 in response to the start signal. If another car is in this block position, as the moving car advances theretowards, the block system holds the advancing car in the rearwardly adjacent block position until the car in the forward block position is advanced.

In a semiautomatic mode, the dockside crane operator signals the operator in the control center 30, and, while watching the action on the appropriate monitors 414 for the crane station 322, the transfer station 271 and the interchange station 269, the control center operator energizes the drive mechanism 304 of the car to cause the car to move along the loop 48 toward and into the interchange station 269, as appropriate, depending upon the other cars on the loop. In either the automatic or semiautomatic modes, the grab 288 of the dockside crane 40 is returned to one of the holds in the bow of the ship for another container 60 after the first container has been deposited on the electric car.

Returning to a consideration of the automatic mode, after advancing through all the intervening block positions, the electric car 50 and the container 60 thereon arrive at the interchange station 269 where the incoming code reader 314 provides identification of the container to the computer means 32 over path 388, 478 and the input path previously described to the process input/output channel 420. The computer means is thus triggered to scan its memory 416 to determine an empty compartment 96 in one of the tiers 94c or 94d. Upon identifying an empty compartment, the code identification of such compartment is transmitted over the process input/output channels 420 and the output circuit 462 previously described to path 484, 384A to the drive mechanism 134, 164 of the stacker crane 38 to cause the same to pick up the container 60 from the car 50 at station 269 and to transfer this container to the empty storage compartment selected by the computer means. The automatic operation of the stacker crane in such pickup and transfer is the same as that previously described for incoming containers. Likewise, information is fed from the stacker crane to the computer means 32 identifying the compartment in which the container has been placed thereby maintaining in the memory of the computer an up-to-date account of the empty or filled condition of the various compartments in the storage housing 26.

In a semiautomatic mode of the system, the computer means 32 or an operator in the control center 30 transmits the same coded information over the desired path to the control panel 237 in the cab 236 of stacker crane 38, and the operator in the cab, upon being informed of the tier 94c or 94d, and perhaps the zone also, to which the container is assigned, merely searches visually for an empty compartment in the tier and zone and operates the stacker crane 38 to pick up and transfer the container to this empty compartment. As with containers coming in from the input/output station 55, however, empty compartment information could be transmitted from the computer means to the operator in the stacker crane cab so as to relieve the stacker crane cab operator of this searching task. Thereafter, information identifying the compartment which is used is transmitted by the operator in the crane cab to the computer 32 or to an operator in the control center 30 by using the control panel 237 in the crane 38 and the communication path previously described.

After the stacker crane 38 has removed the container 60 from the railroad car 50 at the interchange station 269, the car is caused to move out of the interchange station back toward the dockside container crane transfer station 322. This is accomplished in one or more ways. For example, after the stacker crane has lifted the container off the car, the crane operator signals the computer means 32 and/or an operator in the control center 30 over a path described above and believed to be understood whereupon a signal is returned either directly from the computer means or by an action of the control center operator to the car control mechanism 304 thereby causing the car in the interchange station to move out of the station and along the track loop 48. Alternatively, or in conjunction with the method described in the previous sentence, the operator in the control center can observe on the appropriate monitor 414 connected to the TV cameras 411 and 408 when the container has been lifted from the car 50, whereupon the operator can send a signal to the control mechanism for the car causing it to move out of the interchange station. As this car returns toward the dockside transfer station 322, it advances in the various block positions so as not to collide with other cars ahead of it on the loop and thus to advance in its turn back into the station 322 to obtain another container and repeat the cycle just described.

The foregoing description of an unloading cycle by the dockside crane 40 and stacker crane 38 has been with reference to containers 60 which are above deck in the bow of the ship 56. Simultaneously of course, the cranes 42 and 36 have been operating to unload and store abovedeck containers from the stern of the ship. Unloading of abovedeck containers (and subsequent loading of abovedeck containers) is referred to herein as single-cycle operation. That is, in the unloading operation, an electric car 50 obtains a container which has been removed from the ship, carries it to the storage housing 26 where it is removed from the car, and returns to the carrier crane for another container. Thus in single-cycle unloading operation during movement of the car from the carrier crane to the stacker crane the car has a container thereon but in its movement from the stacker crane to the carrier crane it is empty. In the loading operation, the reverse is true.

In what is known herein as dual-cycle operation, containers 60 are both unloaded from and loaded into compartments 364 which are below deck in the ship 56. Inasmuch as it is now believed understood how the system is controlled from the control center 30 in either automatic or semiautomatic modes, description of dual-cycle operation will be made without reference to the specific type of control employed, it being understood that automatic or semiautomatic modes are used in a manner similar to that described above in regard to single-cycle operation.

Assuming that a railroad car 50 is located in the dockside container crane transfer station 322 with a container 60 to be loaded aboard the ship 56, the grab 288 of the dockside crane 40 picks up this container from the car and loads it below deck in one of the compartments 364 of one of the holds 362. It should be noted that as this car and container entered the station 322, the incoming code reader 326 sensed the number of the container and transmitted the appropriate information to the computer means 32 and/or the operator in the control center 30 whereupon either the computer means 32 or the control center operator transmitted a signal to the operator in the dockside crane cab 289, via control panel 290, indicating the presence of the container and the compartment 364 of the ship in which it was to be loaded. Likewise, the dockside crane operator signals the control center that the container has been placed in the correct compartment.

After depositing this container 60 on board the ship 56, the dockside crane 40 picks up a below deck container to be unloaded and places it on the just-emptied railroad car 50 which waits at the transfer station 322 for this purpose. Thereafter, the unloaded container and car move into the storage housing 26 in the same manner as previously described for the unloading of abovedeck containers in a single-cycle operation.

After this unloaded container 60 has been placed in a compartment 96 of one of the tiers 94c or 94d in the storage housing 26, the stacker crane 38 is directed either by the computer means 32 or by the control center operator to another compartment 96 where the stacker crane removes a container-to-be-loaded and places it on the just-emptied railroad car waiting at the interchange station 269.

In removing a container 60 from one of the compartments 96, the empty carriage 184 is moved into the compartment with the wheels 186 riding on the rails 104 and with the lower frame 187 moving in over the container so that the locator switch 231 strikes and sweeps along a wall of the container. When the locator switch 231 reaches the inner end of the container and becomes disengaged therefrom, the drive mechanism 226 is stopped thereby positioning the clamp mechanisms 200 over their adjacent corner fittings 64. With the hooks 204 in open or retracted position, the lower frame 187 is lowered and then the hooks are moved into clamping positions in the sockets 66. The lower frame and grasped container are next raised and the carriage is moved out of the compartment back into retracted position in the C-brackets. In using the locator switch 231 to indicate proper penetration of the compartment, the drive mechanism 226 can be wired to stop automatically or under the control of the operator in the crane cab 236; in the latter case, disengagement of the locator switch 232 transmits a signal which actuates an indicator on the control panel 237.

It is to be noted that during dual-cycle operation, the stacker crane 36 or 38 deposits containers 60 into and removes containers from only the zones of the tiers 94 which include the compartments 96 which are closest to the interchange station 268 or 269 thereby to minimize the travel of the stacker crane among the various compartments and the interchange station, the net result being, of course, to minimize the loading-unloading cycle time. After the railroad car 50 has been loaded with another container, the car and container 60 move out of the interchange station 269 back toward the dockside transfer station 322 in the same manner as described above with regard to single-cycle operation.

As with single-cycle operation, dual-cycle operation is carried out simultaneously by both dockside cranes 40 and 42 and the cars 50 on both loops 46 and 48 by both stacker cranes 36 and 38. In this manner, the below deck area of the ship is rapidly unloaded and loaded.

Finally, the abovedeck compartments 364 of the ship 56 are loaded with containers 60 from the storage housing 26 by using single-cycle operation once again. In this operating sequence, however, the electric cars 50 are loaded with containers as they travel from the interchange stations 268, 269 to the dockside transfer stations 320, 322 and are empty as they travel from these transfer stations to the interchange stations. The specific movement of the components and the control thereof is similar to that already described and will not be repeated.

A significant advantage of the interchange stations 268 and 269 of the subject system is that a container 60, instead of temporarily being placed in the storage housing 26 after it is received at the input/output station 55, can be moved directly onto the ship 56. Thus, such an incoming container is moved from the input/output station 55 by the trolley 262 and placed on one of the transfer conveyors 270 where it is picked up by the stacker crane 36, for example. If container input and output is achieved by a transportation mode using path 57, the stacker crane picks it up directly from this mode at the interchange station. Instead of being controlled to put the container in one of the storage compartments 96, however, the stacker crane can instead be controlled to place this container directly on a railroad car 50 which is waiting at the interchange station whereupon the car and container are then moved directly to the appropriate dockside crane 40 or 42 in the same manner as described above. Conversely, a container being unloaded from the ship can be moved directly to the input/output station, or to such other transportation mode, instead of going into the storage housing, by following the reverse route through one of the interchange stations to that mentioned above for an incoming container. These shortcuts in the travel of a container through the system are under the direction and control of the control center and are made possible by the rapid accessibility to information provided by the computer 32 or even by the centralization of information in, and the dissemination of information by, a central control operator.

Moreover, not only is the above-described shortcut made possible, but the flexibility of the entire system is considerably enhanced through the disclosed interrelationship of the components of the system and the use of the computer circuitry in that the speed of operation is such that the computer means 32 is continuously monitoring and controlling simultaneous movements of the various components of the system. Although the foregoing description has individually considered the broad categories of functions, such as incoming container handling, storing, loading and unloading, the description by necessity has been limited to the carrying out of one or more of these functions by specific components in the system. It will be understood, however, that at the same time as one group of components is carrying out a certain function, other components or groups of components are simultaneously carrying out other functions. The various combinations of movements which are thus under monitor and control are so numerous that a complete description thereof would be very lengthy and in fact unnecessary to an understanding of the present invention. A random example of one combination of movements and controls which may occur simultaneously in the normal operation of the subject system includes the pickup of a container 60 at the interchange station 268 by the stacker crane 36; the operation of the stacker crane 38 to load a different container into a storage compartment 96 in tier 94c; the movement of an unloaded container from a ship 56 via an electric car 50 to an interchange station 268 or 269; the movement of an electric car with an outgoing container toward a transfer station 320 or 322; the movement of other electric cars for loading or unloading purposes along either the loop 46 or 48 or into or out of an interchange or transfer station; the loading of a still different container by dockside crane 42, the reception of an incoming container at the input/output station 55, the unloading of another container by the dockside crane 40; etc. The integrated control of these many different operations occurring simultaneously in the efficient practical manner of the invention is greatly facilitated by the structural interrelationship of the components and considerably enhanced by the use of the computer means 32 and the control center 30. In addition, the same computer circuitry can be used to perform other operations related to the material handling function such as billing, shipping documentation, and inventory control.

For maximum efficiency, it is important that the dockside cranes 40 and 42 be kept operating at full capacity. The subject system is ideally capable of achieving this goal because the dockside transfer stations 322, 324 can be kept occupied with either empty or loaded cars 50 at all times with the flow into and out of the stations occurring in an orderly manner. Underlying this efficiency is the preplanning or programing of the loading and unloading tasks and the ability of the system effectively to utilize the plan or program.

From the foregoing description, it will be understood that the container handling system of the present invention includes a method and apparatus for handling large containers of generally uniform shape and for controlling the reception of such containers into the system, storage of the containers in the system, loading and unloading of containers into and from a carrier, bypass of the storage for direct movement of containers between the input/output station and the carrier, and discharge of containers from the system. In contrast to certain prior art methods of loading and unloading at shipping terminals, the present system is capable of handling containers with a production-line-like efficiency. As explained above, the central coordination of control of the various simultaneous actions occurring within the system is made possible by the unique relationship of the components and their adaptation to computerized control.

Although a preferred embodiment of the present invention has been shown and described, it will be understood that various changes and modifications may be made in the details thereof without departing from the spirit and scope of the appended claims.

I claim:

1. In a cargo-terminal container storage and transfer system including van-type containers of uniform shape, carriers which are to be loaded at different times with such containers, a dock, and a dockside crane having a boom projecting in container-transferring relation to a carrier, the improvement comprising:
   a first transfer station on the dock adjacent to the boom;
   a vertically extending container-storage housing located on the dock, said housing having a plurality of tiers of storage compartments for receiving containers;
   a second transfer station on the dock adjacent to the housing but relatively remote from said first station;
   means passing through the second transfer station for delivering containers entering the terminal to said second station;
   an endless track on the dock passing through the first and second stations;
   cars on the track constrained to move therealong, said cars having means to support containers thereon and having motive means to move along the track into and out of each station;
   stacker crane means in the housing for transferring containers to and from the compartments, to and from said delivering means, and to and from said cars while in said second station;
   control means in the stacker crane means for receiving information about containers;
   said dockside crane having means for transferring containers between a carrier at the dock and said cars while in said first station;
   a control center provided with a computer having memory means which contains information identifying the compartments that are empty and information involving lists of containers and carriers with each list identifying a carrier and the containers assigned to that carrier;
   means for transmitting to the computer input information identifying each container being delivered by the delivering means to said second station;
   said computer being programed to compare said input information about such delivered containers with the lists stored in the memory means and to provide output information indicating either that the container is to be sent directly to the first station or that the container is to be stored and the identity of the storing compartment;
   communication means linking the control center, the dockside crane and the control means so that such output information can be relayed from the control center to the control means to enable an operator in the stacker crane means to control transfers of containers at said second station; and
   means for remotely energizing and deenergizing the motive means of the cars to control movement of the cars along the track between said stations.

2. The system of claim 1 wherein said control means in the stacker crane means includes means for transmitting information to the control center about the compartment in which containers are stored for update of information in the memory means concerning the empty or filled status of the compartments.

3. The system of claim 1 including second control means in the dockside crane for receiving and transmitting information about containers, said communication means interconnecting the second control means and the control center so that an operator in the dockside crane can receive information from, and transmit information to, the control center whereby transfers of containers at said first station are monitored and controlled.

4. The system of claim 3 wherein said carriers have containers to be unloaded, said memory means also containing unloading information involving lists of containers to be unloaded from particular carriers whereby such unloading information can be relayed by the communication means from the control center to said second control means to enable an operator in the dockside crane to remove specified containers from the carrier.

5. The system of claim 1 wherein said track is a railroad track having rails on the dock and wherein said cars are electrically-operated railroad cars having wheels on said rails.